A. P. STEPHENS.
ROTARY METAL CUTTER.
No. 87,985. Patented Mar. 16, 1869.
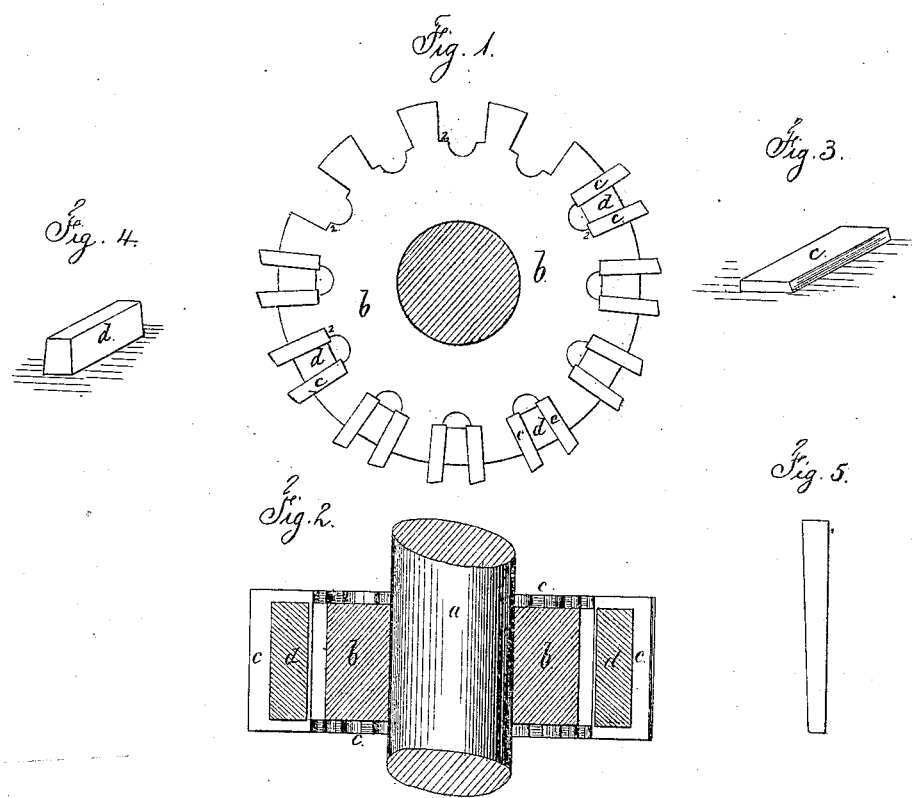

United States Patent Office.

ANSON P. STEPHENS, OF BROOKLYN, NEW YORK, ASSIGNOR TO HIMSELF, NATHAN STEPHENS, AND MELVIN STEPHENS, OF SAME PLACE.

Letters Patent No. 87,985, dated March 16, 1869.

IMPROVED ROTARY METAL-CUTTER.

The Schedule referred to in these Letters Patent and making part of the same.

*To all whom it may concern:*

Be it known that I, ANSON P. STEPHENS, of Brooklyn, in the county of Kings, and State of New York, have invented and made a new and useful Improvement in Rotary Cutting-Tools for Metal; and I do hereby declare the following to be a full, clear, and exact description of the said invention, reference being had to the annexed drawing, making part of this specification, wherein—

Figure 1 is a side view of said cutting-tool with some of the cutters removed;

Figure 2 is a cross-section of the same;

Figure 3 is the cutter detached;

Figure 4 shows the key detached that holds the cutter in place; and

Figure 5 represents the tapering disconnecting-pin.

Similar marks of reference denote the same parts.

Various articles of metal have before been shaped by means of a rotary milling-tool with the edge formed of a shape to produce the desired conformation of the article operated on.

These milling-tools have generally been made of a disk or wheel of steel with the edges filed or cut, to form teeth.

Difficulty is experienced in keeping these teeth sharp, and, in case of one breaking, it is almost impossible to replace it; furthermore, the temper of the steel and its quality vary greatly, often in the same piece of metal, and with every slight variation of shape the whole cutter has to be re-made, or else an entire new cutter substituted.

The nature of my said invention consists in a rotary cutter for metals, formed of a series of plates, secured by wedges driven into openings in the periphery of a wheel or disk, so that said cutter-plates will be firmly held in place, but can be detached for grinding, or to replace a broken cutter, and the wheel or disk will answer for several sets of cutters adapted to dressing surfaces of different configurations.

In the drawing—

$a$ is the shaft carrying the wheel or disk $b$, in the periphery of which notches are cut for the reception of the cutting-plates $c\ c$ and wedges $d\ d$.

The number of cutters placed around the wheel may vary, and the shape of the periphery and of the edges of the cutters may vary, as occasion may require, and there may be one wedge to each cutter, or the wedge be placed between two cutters, as shown.

The angle at which the sides of the wedge stand to each other is to be such that the wedge will drive tightly into place, and the inclination of the cutting-edge to the radial line, or to the tangential line of the wheel or disk, is to be determined according to the character of material operated on, or the shape to be cut.

The inner edge of each cutter-plate rests upon and is firmly supported by a ledge, as at 2, so that it cannot be pressed in while in use, and contiguous thereto, and in a position to come below the wedge $d$, is an opening, running transversely of the wheel or disk, so that the tapering disconnecting-pin can be driven in to force out the wedge, and allow of the removal of the cutter or cutters when required.

This revolving cutting-tool for metals operates much more efficiently than the milling-tools heretofore made. The cutters themselves can be tempered and made much better than the teeth before used, and the cutters can be changed, as may become necessary.

What I claim, and desire to secure by Letters Patent, is—

The notched wheel $b$, formed with the ledges 2, for sustaining the cutter-plates $c$, and with openings for the introduction of a wedge or pin for removing the cutters, substantially as set forth.

In witness whereof, I have hereunto set my signature, this 8th day of January, A. D. 1869.

ANSON P. STEPHENS.

Witnesses:
CHAS. H. SMITH,
GEO. T. PINCKNEY.